Sept. 20, 1955     K. H. ADAMEK     2,718,115
GAS TURBINE MOTOR
Filed Jan. 14, 1952
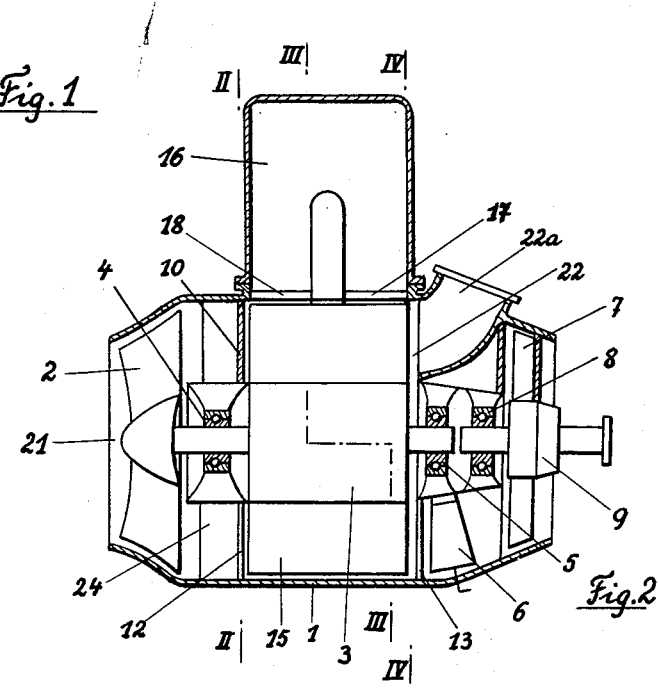
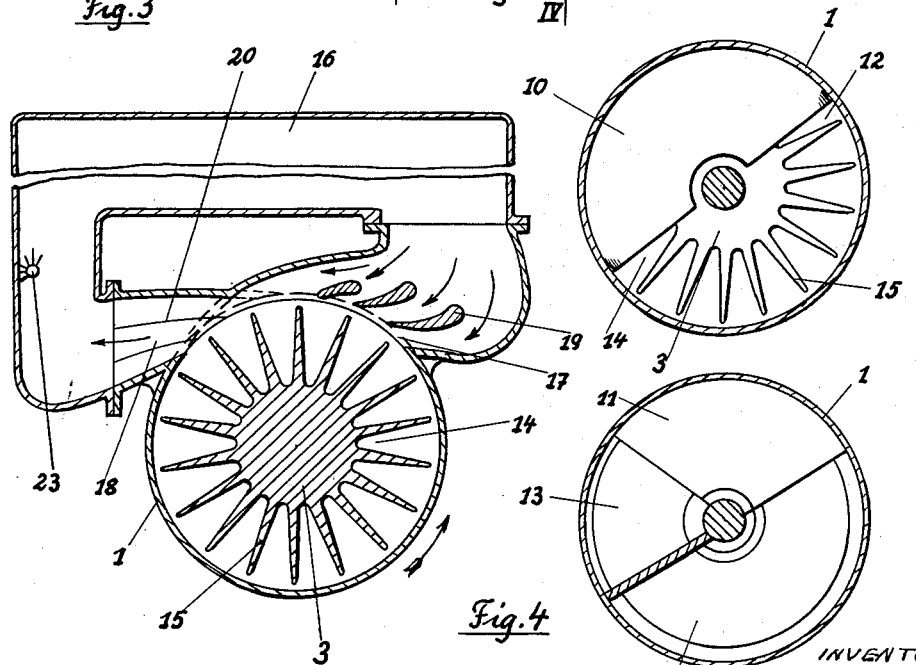

United States Patent Office

2,718,115
Patented Sept. 20, 1955

2,718,115

GAS TURBINE MOTOR

Karl Heinz Adamek, Pinneberg (Holstein), Germany, assignor to Inconex Handelsgesellschaft m. b. H., fur industrielle Produkte-Konstruktionen-Export, Stuttgart, Germany, a firm Application January 14, 1952, Serial No. 266,330

4 Claims. (Cl. 60—39.45)

This invention relates to a gas turbine plant with a chambered rotor pressure exchanger with preponderantly thermic compression. The gas turbine plant comprises a scavenging blower for scavenging the pressure exchanger, a combustion chamber, and a work turbine.

So far known were turbine drive gears in which the gas supplying the work was thermically compressed within chambers, opened and closed by control mechanisms, by a pulsating combustion of fuel. This type of gas turbine drive gear, despite its high theoretical efficiency, could not be developed beyond the stage of individual experimental sets for scientific investigation, because they show great losses in the control and scavenging of their combustion chambers. The difficulties in that line, above all, kept the revolutions per minute within low limits.

Further known are gas turbine drive gear constructions in which the working gas is compressed in turbine or other compressors, thereafter to be heated up in a combustion chamber or a heat exchanger, the heat then to be utilized when expanding the gases in a turbine. This type of gas turbine drive gear is suited only for large output because in engines for smaller output, even under favorable additional heating conditions, the quantity of the working gas, and thereby the cross section of the flow will diminish, on the other hand also the circumferential velocity not only of the turbine compressor but also of the gas turbine will have to be kept high for obtaining good partial efficiencies within this engine aggregate. All these contradicting demands will lead in engines for medium output, namely a few hundred HP, to such high R. P. M. ($n$=40,000 to 70,000 R. P. M.) that, for instance, the question of bearings able to stand up will become difficult, as will the problem of balancing the masses. Diminished R. P. M. will have strong repercussions on the partial efficiencies, thereby unfavorably depressing the total efficiency.

This invention is to avoid the losses of thermic compression resulting in the chamber and the control mechanisms from the pulsating flow. Furthermore, the dependency of the effective power (third power), in equal pressure turbine drive gear engines, and of the efficiency on the R. P. M. is intended to be overcome, realizing for small and medium output a number of revolutions for which the bearing question can be satisfactorily solved.

The solution of this problem consists, in the aggregate of the invention, in a scavenging blower for scavenging the pressure exchanger, a combustion chamber and a work turbine. Parallel with the combustion chamber there is provided a cell wheel pressure exchanger in which a part of the pressure of the combustion chamber gases is utilized for compressing the air pressed by the scavenging blower into the cells, before the air gets into the combustion chamber. The remaining pressure of the combustion gases is utilized for creating work in the turbine.

By means of such axial arrangement of the scavenging blower, the chambered rotor and the turbine rotor, one after another, the scavenging blower most suitably being coupled with the rotor, the inventor created a gas turbine drive gear for small and medium output. The turbine rotor may have a sense of rotation equal or contrary to that of the rotor.

The approximately cylindrical housing of the drive gear is provided at the front sides of the rotor with well closing intermediate bottoms which have axial control openings from the scavenging blower to the rotor and also from the rotor to the gas turbine and the exhaust. Connected with the rotor housing mantle is the combustion chamber or the heat exchanger. The rotor housing is connected with the combustion chamber via radial control openings, one designed for leading the work gases from the combustion chamber to the rotor chambers, the other for guiding the fresh gases from the rotor chambers to the combustion chamber. The connections from the combustion chamber spaces to the radial control openings of the rotor contain guiding devices meant to facilitate a tangential influx into the rotor along paths of varying pressure conditions, on the other hand making it possible that the fresh gases, flowing tangentially with high speed from the chambered rotor, will get into the combustion chamber with a minimum of losses. The rotor chambers are formed by the radially arranged, preponderantly axially running blades of the rotor.

According to the invention a spiral leading grid is arranged between the scavenging blower and the chambered rotor, leading the scavenging air into the rotor chambers with an approximately equal circumferential component at the beginning and the end of the scavenging process.

Between the rotor and the turbine there is arranged a guiding device adapted to the pressure gradient varying in the direction of the circumference.

The control openings in the intermediate bottoms and the rotor housing mantle are so arranged that the rotating chambers of the rotor first come in contact with the axial scavenging blower- and exhaust opening, then with the radial conduit from the combustion chamber and the radial outlet into the combustion chamber, with partial covering, and finally with the outlet axial to the turbine rotor and the exhaust.

The compression of the fresh gases in the rotor chambers is effected immediately by hot gases flowing in from the combustion chamber into the rotor chambers; thus the pressure rise in the system takes place exclusively by heating up the work gases in the combustion chamber, until they reach the condition of pressure equilibrium $$\frac{p_2}{p_0} = \frac{T_2}{T_0}$$

In the accompanying drawing a practical working example of the subject of the invention is shown in diagram, as follows:

Fig. 1 is a lengthwise section through the gas turbine plant,
Fig. 2 is a section of the line II—II of Fig. 1,
Fig. 3 is a section of the line III—III of Fig. 1,
Fig. 4 is a section of the line IV—IV of Fig. 1.

In an approximately cylindrical housing 1, a scavenging blower 2 and a chambered rotor 3 coupled with it, as well as a turbine 7, are arranged. Scavenging blower 2 and rotor 3 are on bearings 4 and 5. The turbine 7 is arranged behind leading grid 6, most suitably independent from rotor 3, in bearings 8 and 9. On both front sides of the rotor 3 intermediary partition walls 10, 11 are arranged, closing the rotor, leaving only the control openings 12, 13, and 22. Opening 12 serves for admitting fresh air from blower 2 into rotor chambers 14, formed by radially arranged preponderantly axially running blades 15. Opening 13 creates the connection from the rotor chambers 14 via the leading grid 6 to the gas turbine 7, while opening 22 leads from the chambers 14 to exhaust 22a.

Connected with housing 1 is a combustion chamber 16 or a heat chamber. Combustion or heat chamber 16 is connected, via control openings 17 and 18 in the rotor housing 1, with the rotor chambers 14. Opening 17 is provided with a leading grid 19 for guiding the work gas from the heat chamber 16 to the rotor chambers, while opening 18 is equipped with a leading grid 20 for leading the work gases from the rotor chambers 14 to the heat chamber 16. As indicated in section III—III of Fig. 1, the control opening 17 for leading the hot gases from the combustion chamber 16 to the rotor 3 is located, looking at the housing mantle in the direction of rotation, behind the outlet 18 for the fresh gases from the rotor into the combustion chamber (Fig. 3), thus the end of opening 17 coincides with the end of control opening 18.

The arrangement according to the present invention makes possible the following circular process:

The fresh air will enter at 21 into the scavenging blower 2, from there to be blown via the control opening 12 into the open chambers 14 shown in Fig. 2, these to be filled with fresh air without any overpressure worth mentioning, simultaneously expelling the expanded work gases at 22 before the fresh air flowing in. The rotor chambers 14, after the following rotation, will control opening 17, through which, after the circular process has reached its definite equilibrium the hot gases will enter tangentially into the rotor chambers, thereby, all in accordance with the equilibrium pressure in combustion chamber 16, compressing the fresh gases in the rotor chambers. This compression is concluded when control opening 18 is reached. Then the fresh air will enter combustion chamber 16 to be heated by combustion jet 23, pressing thereafter as hot gas through opening 17 into the connecting chambers 14, there to compress the fresh air in them, which, after a continued rotation of the chambers, at 18 is propelled into the combustion chamber 16.

After the passage of control opening 18, the chambered rotor contains preponderantly hot gas of the temperature $T_2$ and the pressure $p_2$. These hot gases will consecutively expand through the axial control opening 13 via the leading grid 6 to the turbine 7, to which they transmit their energy.

On account of this arrangement of a continuous flow of the work gases in the several rotor chambers, passing radial and axial control openings, the spatial side by side of the rotor chambers is accompanied by a consecutive process in time of the gas components, thus, despite a continuous stationary flow in the scavenging blower 2 (low pressure), the combustion chamber 16 (high pressure), leading grid 6, turbine 7, and exhaust 22a, there is an orderly series of processes following each other in the individual rotor chamber 14, scavenging and filling with fresh gases, compression and propulsion of the fresh gases into the combustion chamber by the hot gases filling the rotor chambers and the expansion of these hot gases from the rotor chamber.

Bringing rotor 3 and scavenging blower 2 on revolutions, without heating up the air either in the heating or combustion chamber 16 or in the heat exchanger, only a small part of the air flowing through will again enter, due to the centrifugal force in the sideline stream, through the control opening 18 via control opening 17 into the rotor chamber 14. The overpressure in combustion chamber 16 is approximately equal to 0, and an expansion in the guiding grid 6 cannot take place, the air will leave the exhaust 22a only during the scavenging cycle.

Starting now the heater 23, the temperature of the combustion chamber air, and thus the pressure in the combustion chamber and the rotor chambers, will rise. The latter are open only towards the combustion chambers (a closed system $p \times v = R \times T$), thus into the now passing rotor chambers at first additional hot gases can stream in through 17, thus also more fresh gas weight is pushed through 18 into the combustion chamber 16. Thereby, the involved circular process in the combustion chamber will rapidly grow, soon to reach the value of 1 (all the air flowing through the combustion chamber), the pressure in which will rise towards the theoretical limit value of $$p_2 = p_0 \frac{T_2}{T_0}$$

Thus the weight part of the hot gases flowing through the leading grid 6 and turbine 7 will become increasingly larger until it will approximately reach the percentage value of $$1 - \frac{(T_0)^{\frac{1}{K}}}{(T_2)}$$

If, for instance, there are the following figures:

Combustion chamber temperature _____ $t_2 = 900°$ C.; $T_2 = 1173°$ K.,
External temperature _____ $t_0 = 15°$ C.; $T_0 = 285°$ K., The combustion chamber pressure will be __ $p_2 = \frac{1173}{288} \times p_0 = 4$ atmospheres absolute.

The turbine part is 60–65%
The exhaust part is 40–35%} of the total gas quantity.

The losses occurring also in this circular process due to flow around slits can be kept small by constructive measures. To be sure, the heating of the scavenging air in the rotor chambers before the begining of the compression will result in a noticeable lowering of the effect obtainable per unit of chamber volume, due to a lowering of the filling weight; however, the lowering of the efficiency will be much less. At temperature conditions >2, during the influx of the hot gases into the rotor chambers, temporarily hypercritical conditions will occur, but the weight part at the temperatures and pressures coming in question will remain small, and the degree of efficiency of the compression impulses will be very good, thus the degree of efficiency of the compression will be better than in flow- or piston compressors.

The advantages of the plant according to the present invention consist in the fact that the compression ratio and the degree of efficiency are almost independent of the R. P. M., thus already at 15,000–20,000 R. P. M. output figures of 100–200 H. P. can be obtained with a satisfactory degree of efficiency. An additional feature is that, owing to the disconnected construction, namely the turbine 7 on the one hand and the rotor 3 and scavenging blower 2 on the other hand, they are independent of each other in their revolutions, thus under large load the R. P. M. of the work turbine may become less without lessening at the same time the R. P. M. of rotor 3, which determines the output to be reached. At very low R. P. M., on the other hand, the rotor will adapt itself to the load by lowering its revolutions, thus the work turbine can run at a number of revolutions guaranteeing the highest degree of efficiency.

After the close of the circular process the chambers 14 again come in contact with opening 12, to be anew scavenged with fresh air and filled.

Various structural changes and modifications or complementary arrangements may be resorted to in gas turbine plants redesigned as shown and described without departing from the spirit and the salient ideas of this invention.

I claim:

1. A gas turbine motor in which the working gases are preponderantly compressed thermally, comprising a scavenging blower, a chambered rotor coupled therewith and a turbine in tandem axial alignment, the chambered rotor being laterally provided with a heating chamber, said chambered rotor being surrounded by an enclosing housing, tightly closing stationary partition walls provided with control openings therein arranged between the chambered rotor and the scavenging blower and between the chambered rotor and turbine and said housing having control openings in communication with the heating chamber.

2. A gas turbine as in claim 1, wherein leading grids between the heating chamber and chambered rotor effect a tangential flow into the chambered rotor along layers of flow of different pressure and said grids also leading fresh gases from the chambered rotor tangentially and at high speed with a minimum of loss to the heating chamber.

3. A gas turbine as in claim 2, wherein the chambered rotor has radially arranged preponderantly axially running blades coacting to form intervening chambers.

4. A gas turbine as in claim 3, wherein the turbine is coupled with the chambered rotor.

References Cited in the file of this patent

UNITED STATES PATENTS

| | | |
|---|---|---|
| 2,399,394 | Seippel | Apr. 30, 1946 |
| 2,418,911 | Smith | Apr. 15, 1947 |
| 2,461,186 | Seippel | Feb. 8, 1949 |